United States Patent
Anghel et al.

(10) Patent No.: US 9,450,527 B2
(45) Date of Patent: Sep. 20, 2016

(54) CONTROLLED FREQUENCY GENERATOR WITH OPTIMIZED POWER FACTOR

(71) Applicant: HONEYWELL INTERNATIONAL INC., Morristown, NJ (US)

(72) Inventors: Cristian Anghel, Oro Valley, AZ (US); Ming Xu, Oro Valley, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 357 days.

(21) Appl. No.: 14/197,565

(22) Filed: Mar. 5, 2014

(65) Prior Publication Data

US 2016/0190962 A1  Jun. 30, 2016

(51) Int. Cl.
*H02P 9/00* (2006.01)
*H02P 9/02* (2006.01)
*H02P 9/10* (2006.01)

(52) U.S. Cl.
CPC . *H02P 9/00* (2013.01); *H02P 9/02* (2013.01); *H02P 9/105* (2013.01)

(58) Field of Classification Search
CPC ............. H02P 9/00; H02P 9/02; H02P 9/105
USPC ........................................ 322/7, 59, 44, 95
See application file for complete search history.

(56) References Cited

U.S. PATENT DOCUMENTS

| | | | |
|---|---|---|---|
| 5,770,909 A * | 6/1998 | Rosen | H02K 11/042 310/113 |
| 5,801,460 A | 9/1998 | Diemer et al. | |
| 6,838,860 B2 * | 1/2005 | Huggett | H02J 3/1842 322/28 |
| 6,909,263 B2 | 6/2005 | Xu et al. | |
| 7,355,367 B2 * | 4/2008 | Sarlioglu | F01D 15/10 290/4 D |
| 7,915,869 B2 | 3/2011 | Xu et al. | |
| 7,952,331 B2 | 5/2011 | Anghel et al. | |
| 8,085,004 B2 * | 12/2011 | Xu | H02K 19/26 290/31 |
| 8,421,423 B2 * | 4/2013 | Nakada | H02J 7/245 322/28 |
| 2005/0225303 A1 * | 10/2005 | Xu | F02N 11/04 322/59 |
| 2007/0194572 A1 | 8/2007 | Xu et al. | |
| 2010/0308581 A1 * | 12/2010 | Anghel | F02C 7/275 290/31 |

\* cited by examiner

*Primary Examiner* — Julio Gonzalez Ramirez
(74) *Attorney, Agent, or Firm* — Shimokaji IP

(57) ABSTRACT

Apparatus for generating and supplying electrical power to AC loads on an aircraft may include a prime mover, an exciter generator rotatably coupled to the prime mover and a main generator with a main generator rotor electrically coupled to the exciter generator to receive AC power from the exciter generator. One or more capacitors may be electrically coupled to the main generator rotor to increase a power factor of the main generator rotor.

10 Claims, 4 Drawing Sheets

CONTROLLED FREQUENCY GENERATOR WITH OPTIMIZED POWER FACTOR

BACKGROUND OF THE INVENTION

The present invention relates to AC generators and, more particularly, to AC generators that are driven by an aircraft engine to provide a constant frequency output.

In many of today's electric power systems for aircraft, electrical generators are required to produce power at a constant frequency (e.g., 400 Hz). In some instances, constant frequency power may be produced by driving an AC generator at a constant rotational speed. For example, an auxiliary power unit (APU) may be employed to drive the AC generator. The APU may be controlled to rotate at one particular speed because its speed of operation may be independent of varying main engine power demands needed to control propulsion of the aircraft.

Alternatively some aircraft designs employ a hydromechanical transmission interposed between a variable speed engine and a generator. The transmission may be controlled so that rotational speed of the generator may remain relatively constant even though the engine speed may vary to meet propulsion demands.

In still other aircraft power systems, constant frequency AC power may be produced by coupling a constant frequency generator (CFG) to a variable speed engine. In a typical CFG, an exciter generator may supply AC power to a main generator rotor. A controller may be employed to vary speed of rotation of rotor flux so that irrespective of physical rotation speed of the rotor, AC power at the desired constant frequency is produced. In some instances, the exciter generators may be large and heavy and may contribute substantially to overall weight and cost of a CFG.

As aircraft designs evolve there is a continuous recognition of the desirability of reducing weight and cost of components. Additionally there is a continuing effort to improve engine operating parameters to reduce fuel consumption.

As can be seen, there is a need for an aircraft electrical system that may produce constant frequency AC power without incurring weight and cost penalties associated with hydromechanical transmissions, or requirements for constant speed operation of an APU. Additionally there is a need for a CFG with an exciter generator that may be constructed with relatively low weight and cost.

SUMMARY OF THE INVENTION

In one aspect of the present invention, apparatus for generating and supplying electrical power to AC loads on an aircraft may comprise a prime mover; an exciter generator rotatably coupled to the prime mover; a main generator rotatably coupled to the prime mover, the main generator having a main generator rotor electrically coupled to the exciter generator to receive AC power from the exciter generator; and one or more capacitors electrically coupled to the main generator rotor to increase a power factor of the main generator rotor.

In another aspect of the present invention, a constant frequency generator (CFG) may comprise an exciter generator; a main generator; and one or more capacitors electrically coupled to a rotor of the main generator to alter a power factor of the said rotor.

In still another aspect of the present invention, a method for providing AC power to an AC load at a constant frequency with a variable speed prime mover may comprise the steps of: a) driving an exciter generator with the prime mover to provide controlled AC power to a rotor of a main generator of a constant frequency generator (CFG); b) electrically coupling capacitance to the rotor of the main generator to alter a power factor of said rotor; and c) driving the main generator rotor with the prime mover to the provide AC power at a constant frequency from a stator of the main generator.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides a system by which an aircraft electrical system can be supplied with constant frequency AC power. More particularly, the present invention provides a constant frequency generator (CFG) driven by a variable speed engine such as an aircraft main engine or an auxiliary power unit (APU) operated at a reduced speed. The CFG is provided with a system for limiting reactive power applied to a rotor of the CFG by an exciter generator so that size and weight of the exciter generator may be optimized.

Figure 1:
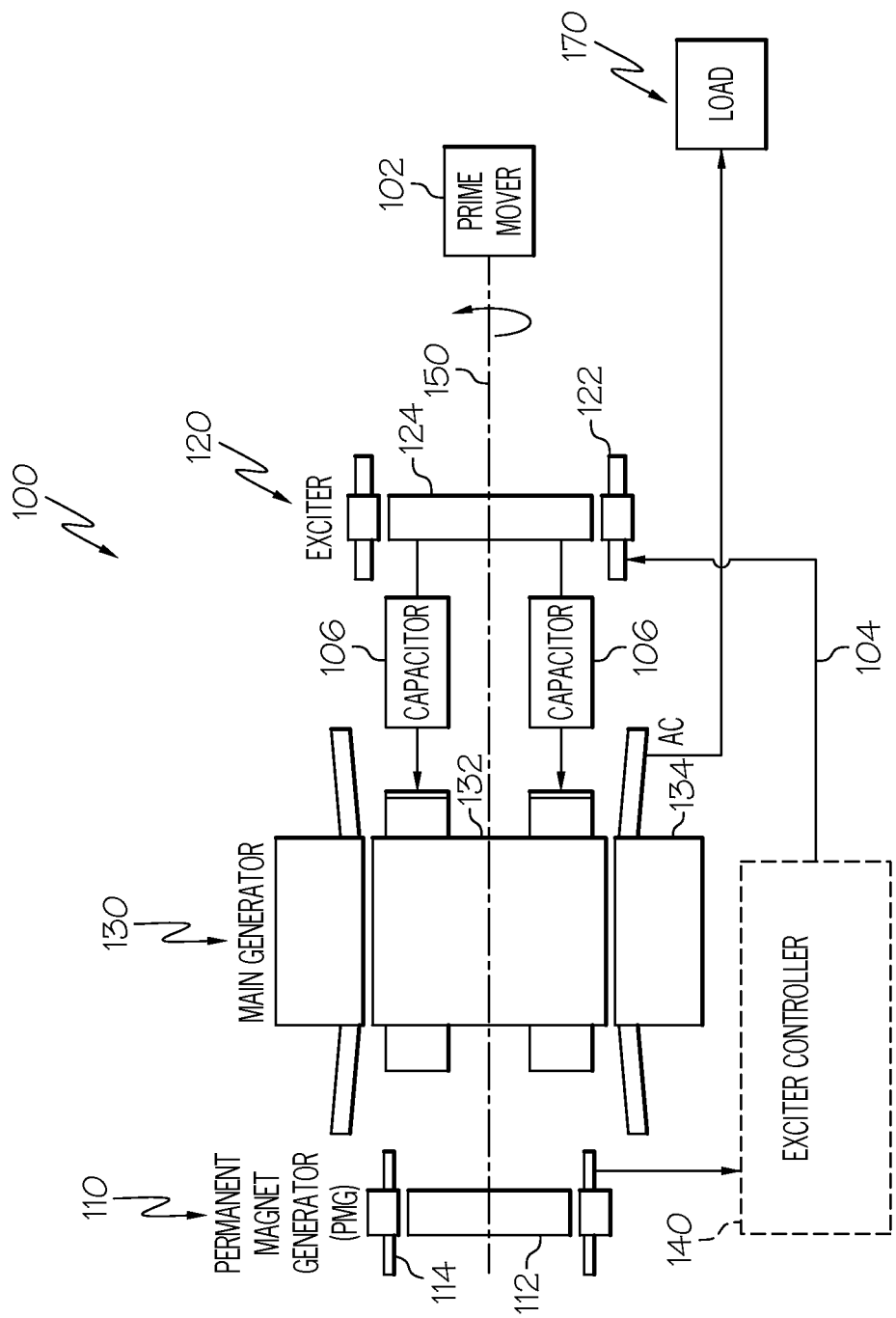
FIG. 1 is a schematic diagram of AC power generating system in accordance with an embodiment of the invention.

Turning now to the description and with reference first to FIG. 1, a functional schematic block diagram of an exemplary high speed constant frequency generator (CFG) 100 for use with a prime mover 102, for example, an aircraft gas turbine engine, is shown. The CFG 100 may supply constant frequency AC power to a load 170. This exemplary CFG 100 may include a permanent magnet generator (PMG) 110, an exciter generator 120, a main generator 130, and an exciter controller 140. It will be appreciated that the CFG 100 may also include one or more additional components, sensors, or controllers. However, a description of these additional components, sensors, and controllers, may be found in U.S. Pat. No. 8,085,004, issued Dec. 27, 2011 which is incorporated herein by reference. Such descriptions of components will therefore not be further depicted or described herein In the depicted embodiment, a PMG rotor 112 of the PMG 110, an exciter rotor 124 of the exciter 120, and a main generator rotor 132 of the main generator 130 may be mounted on a common drive shaft 150. The drive shaft 150 may receive a rotational drive force from the prime mover 102, which may cause the PMG rotor 112, an exciter rotor 124, and a main generator rotor 132 to all rotate at the same rotational speed. In an exemplary embodiment of the system 100, the rotational speed of the prime mover 102, and thus these generator system components, may vary.

Regardless of the specific rotational speed range, it will be appreciated that as the PMG rotor 112 rotates, the PMG 110 may generate and supply AC power to the exciter controller 140 from a PMG stator 114. The exciter controller 140 may be electrically coupled to an exciter stator 122. The exciter controller 140 may produce control signals 104 to command the exciter generator 120 to supply AC power to the main generator rotor 132. As described in U.S. Pat. No. 8,085,004, the controller 140 may vary speed of rotation of rotor flux so that irrespective of physical rotation speed, AC power at the desired constant frequency is produced by the main generator 130.

The main generator rotor 132 may have a non-unity power factor. Thus the AC power provided to the main generator rotor 132 may include both active power and reactive power. To the extent that the exciter generator 120 supplies reactive power, the exciter generator 120 may be heavier and larger than it could otherwise be if required to deliver only active power to the main generator rotor.

In order to mitigate the undesirable effects of a low power factor of the main generator rotor 132, some inductive effects of the rotor 132 may be offset by introducing capacitance to the rotor 132. For example, as shown in FIG. 1, one or more capacitors 106 may be directly interposed between the exciter rotor 124 and the main generator rotor 132. Introduction of the capacitors 106, electrically coupled with the main generator rotor 132, may increase the power factor of the main generator rotor 132 and thereby reduce the overall AC power demands of the exciter generator 120. Consequently, the exciter generator 120 may be constructed in a smaller size and with lighter weight than that which would be required if the capacitors 106 were not present.

Figure 2:
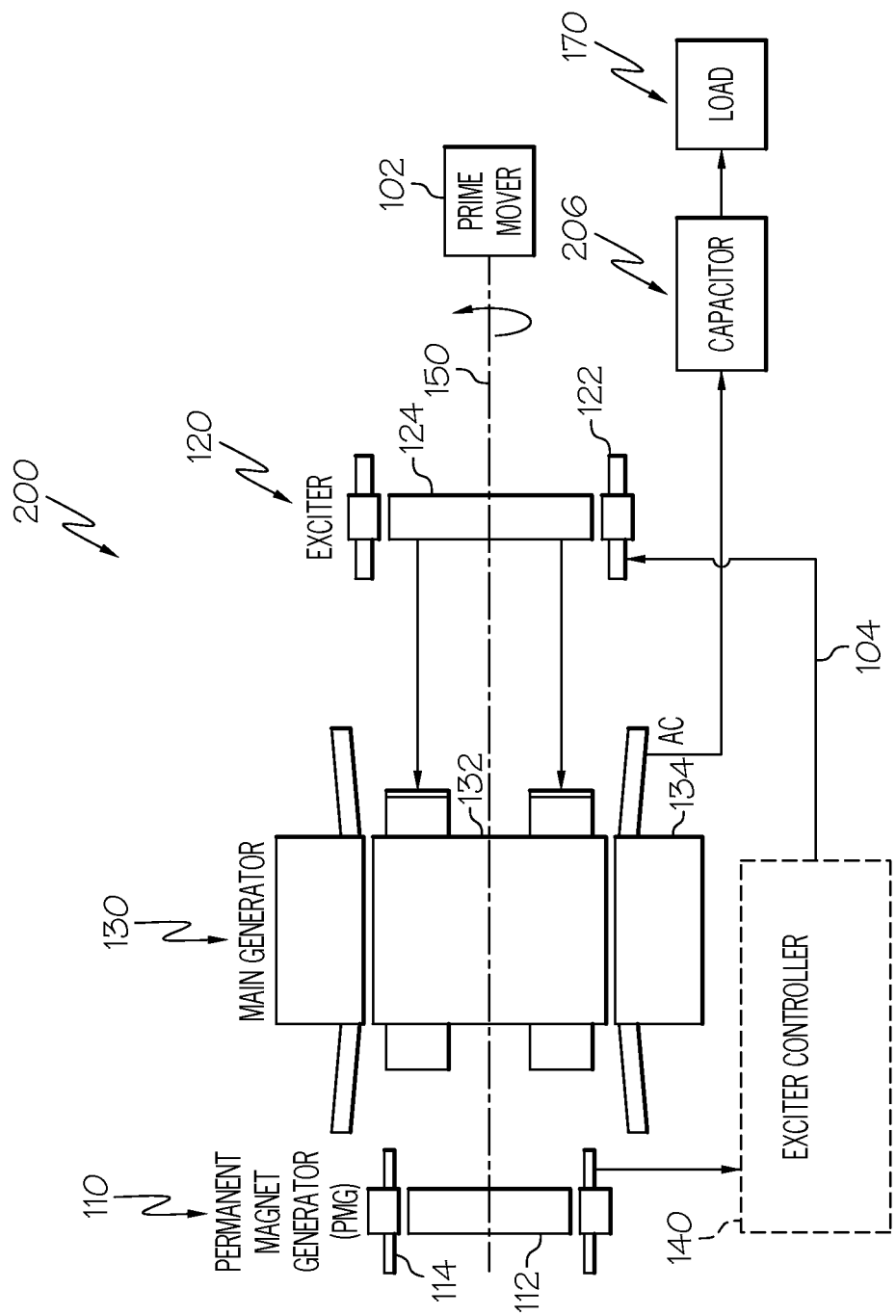
FIG. 2 is a schematic diagram of AC power generating system in accordance with a second embodiment of the invention.

Referring now to FIG. 2, another exemplary embodiment of a generator system 200 may employ one or more capacitors 206 interposed between the main generator stator 134 and the load 170. Presence of the capacitors 206 coupled to the stator 134 may introduce compensation for inductance effect in the main generator rotor 132. In other words, the capacitors 206 may increase the power factor of the main generator rotor 132. Indeed, for any particular value of capacitance, the capacitor 206 may provide power factor correction greater than that which may be achieved by the capacitors 106 of FIG. 1. This advantageous improvement in power factor correction may result from an equivalent capacitance several times larger than the physical value of the capacitors 206 being reflected at the main generator rotor 132. In that regard, the capacitors 206 may be considered to be electrically coupled with the main generator rotor 132. This equivalent capacitance may be larger than the physical capacitance of the capacitors 206 by a factor that corresponds to a turns ratio of windings of the rotor 132 relative to the stator 134.

Figure 3:
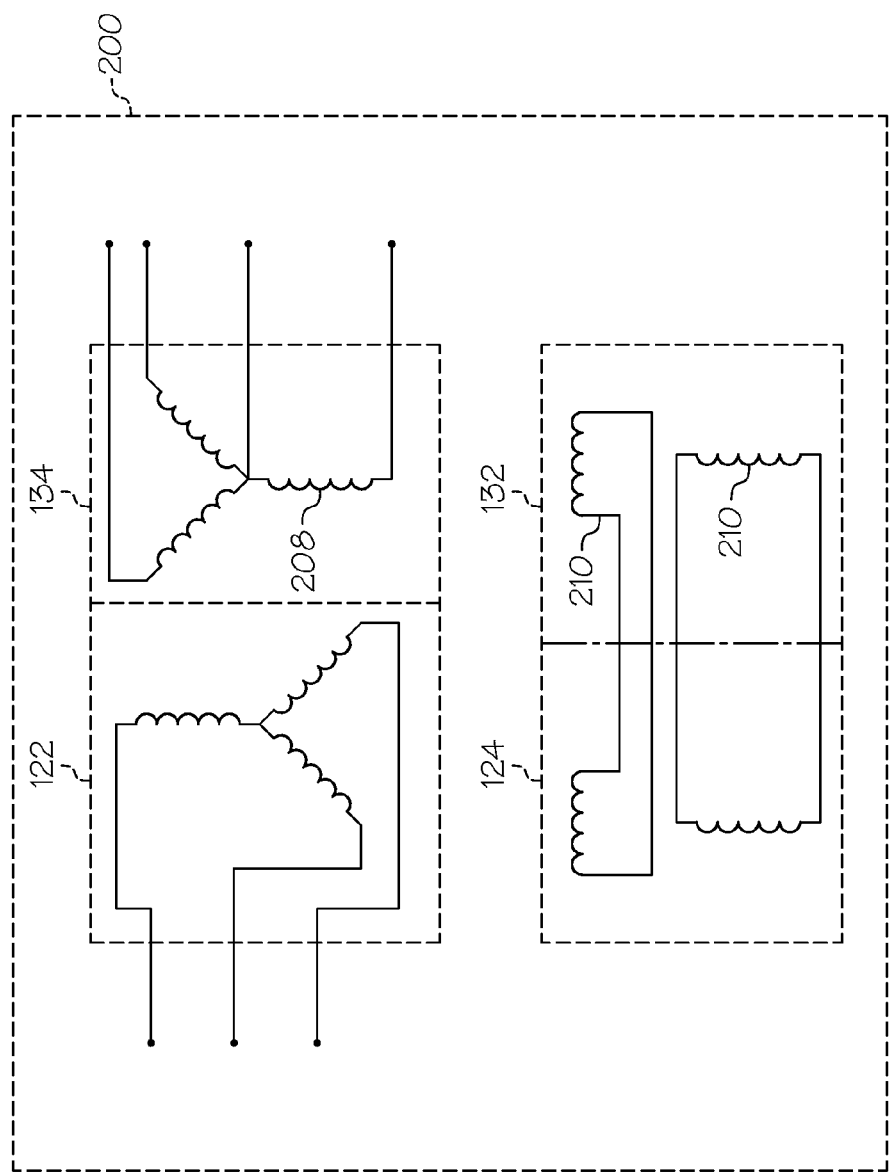
FIG. 3 is a schematic windings diagram of the generating systems of FIG. 1 or 2 in accordance with an embodiment of the invention.

Referring now to FIG. 3, it may be seen that the CFG 200 may include various windings. In particular, the CFG 200 may include main rotor windings 208 and main stator windings 210. The main rotor windings 208 may include a first number of windings and the main stator windings 210 may include a second number of windings. A ratio of the first number of windings to the second number of windings may be considered a turns ratio.

A total capacitance of the capacitor 206 (FIG. 2) may be selected in accordance with an expression $C_t = C_d (n_r/n_s)^2$ where $C_t$ is the total capacitance;

$C_d$ is a desired equivalent capacitance at the main generator rotor 132;

$n_r$ is the number of turns of the windings 210 of the main generator rotor 132; and $n_s$ is the number of windings 208 of the main generator stator 134.

In a particular example of an application of the capacitors 206 to the stator 134, it has been found that a capacitor or bank of capacitors with a value of 1 milifarad and a weight of about 2-3 pounds may result in an improvement of power factor of the main generator rotor 132 from 0.5 to about 0.85. This may result in a 20-25 pound weight reduction of a 140 kVA CFG.

It may be noted that, in an exemplary embodiment, the prime mover 102 may be an aircraft auxiliary power unit (APU). In some pre-existing aircraft designs, an APU may be operated at a constant rotational speed. In such an operating mode, constant frequency AC power may be produced without employing a CFG. However, it has now been found desirable to operate APU's at varying speeds in order to save fuel. In that context, attainment of constant frequency AC power may require use of a CFG.

Figure 4:
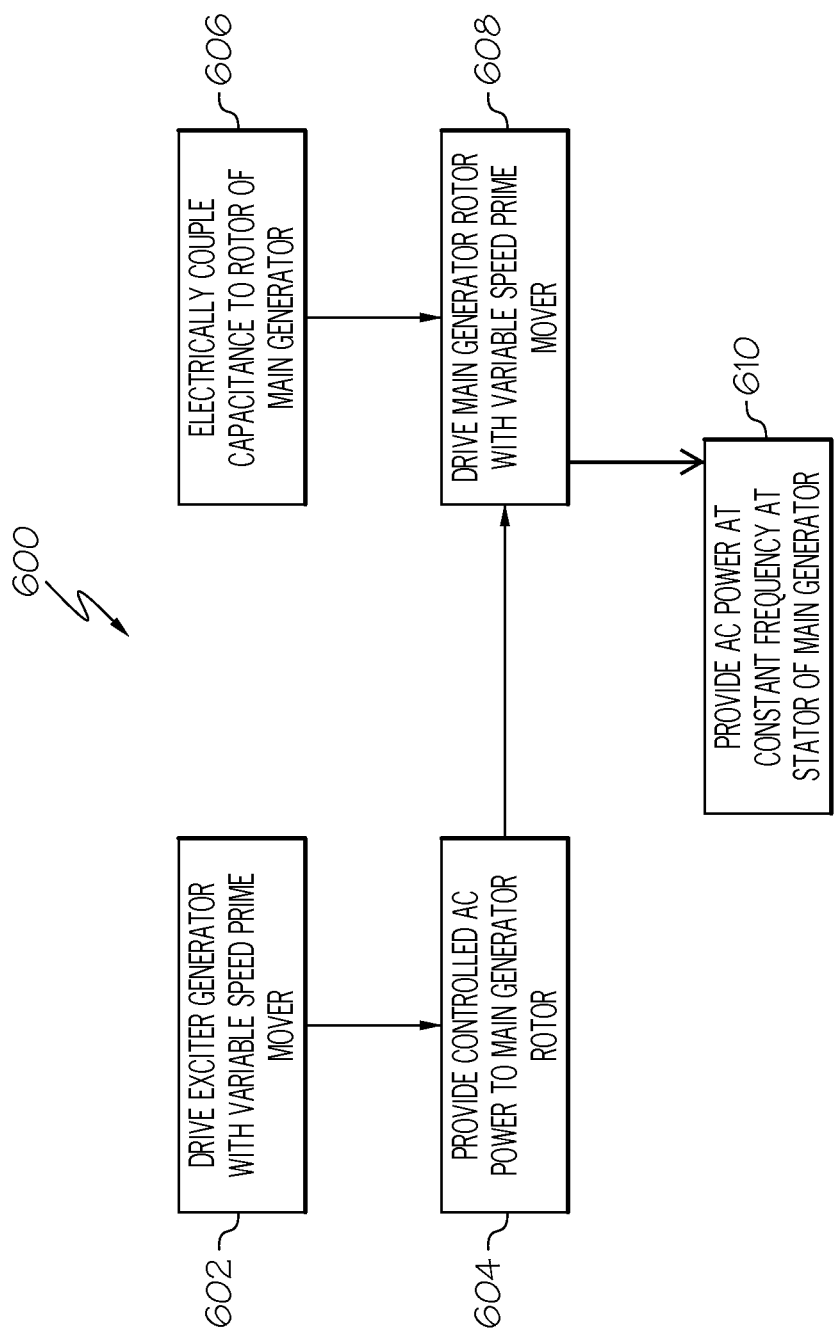
FIG. 4 is a flow chart of a method for providing AC power to an AC load at a constant frequency with a variable speed prime mover in accordance with an embodiment of the invention.

Referring now to FIG. 4, a flow chart 600 may illustrate a method for providing AC power to an AC load at a constant frequency with a variable speed prime mover. In a step 602, an exciter generator may be driven with a variable speed prime mover (e.g., the exciter generator 120 may be driven by the prime mover 102). In a step 604, controlled AC power may be provided to a rotor of a main generator of a CFG, (e.g., AC power, controlled by the exciter controller 140 may be provided to the main generator rotor 132 of the CFG 100 or 200) In a step 606, capacitance may be electrically coupled to the rotor of the main generator to alter a power factor of said rotor, (e.g., capacitor 106 or 206 may be electrically coupled to the main generator rotor 132. In a step 608, the main generator rotor may be driven by the prime mover, (e.g., the prime mover 102 may drive the rotor 132). In a step 610, AC power at a constant frequency may be provided from a stator of the main generator, (e.g., AC power may be provided to AC loads 170 from the stator 134 of the CFG 100 or 200).

It should be understood, of course, that the foregoing relates to exemplary embodiments of the invention and that modifications may be made without departing from the spirit and scope of the invention as set forth in the following claims.

We claim:

1. Apparatus for generating and supplying electrical power to AC loads on an aircraft comprising:
   a prime mover;
   an exciter generator rotatably coupled to the prime mover;
      a main generator rotatably coupled to the prime mover, the main generator having a main generator rotor electrically coupled to the exciter generator to receive AC power from the exciter generator;
      one or more capacitors electrically coupled to the main generator rotor configured to increase a power factor of the main generator rotor; and
      wherein the one or more capacitors are electrically coupled to the main generator rotor by being interposed between a rotor of the exciter generator and the main generator rotor.

2. The apparatus of claim 1 wherein the prime mover is an auxiliary power unit (APU) of the aircraft.

3. The apparatus of claim 2:
wherein the APU drives the main generator at varying speeds; and
wherein the AC power supplied to the electrical loads is supplied at a constant frequency irrespective of speed of operation of the APU.

4. The apparatus of claim 1 wherein a stator of the main generator provides AC power to the AC loads of the aircraft at a constant frequency irrespective of speed of the prime mover.

5. The apparatus of claim 1 wherein the power factor of the main generator rotor is no lower than about 0.80.

6. The apparatus of claim 1:
wherein the main generator is rated to deliver power at about 140 kVA; and
wherein the one or more capacitors has a capacitance no greater than about one milifarad.

7. The apparatus of claim 1 wherein the prime mover is a main engine of the aircraft.

8. A constant frequency generator (CFG) comprising:
an exciter generator;
a main generator;
one or more capacitors electrically coupled to a rotor of the main generator to alter a power factor of the said rotor; and
wherein the one or more capacitors are electrically coupled to the main generator rotor by being interposed between a rotor of the exciter generator and the rotor of the main generator.

9. The CFG of claim 8:
wherein the main generator rotor has a first number of windings;
wherein the main generator stator has a second number of windings; and
wherein a total capacitance of the one or more capacitors is selected in accordance with an expression $C_t = C_d/(n_r/n_s)^2$ where
$C_t$ is the total capacitance;
$C_d$ is a desired equivalent capacitance at the main generator rotor;
$n_r$ is the number of turns of the windings of the main generator rotor; and
$n_s$ is the number of windings of the main generator stator.

10. The CFG of claim 8 wherein the one or more capacitors alters a power factor of the main generator rotor from about 0.5 to about 0.85.

* * * * *